United States Patent [19]
King et al.

[11] 3,710,381
[45] Jan. 9, 1973

[54] SIGNAL-TO-NOISE DETECTOR FOR NON-STABILIZED DOPPLER RADAR

[75] Inventors: Stanley King, Larchmont; Peter R. Tierney, Briarcliff Manor, both of N.Y.

[73] Assignee: The Singer Company, Little Falls, N.J.

[22] Filed: Aug. 30, 1971

[21] Appl. No.: 175,883

[52] U.S. Cl. ............................................. 343/8
[51] Int. Cl. ........................................... G01s 9/44
[58] Field of Search ................ 343/8, 9, 5 PD, 7.7

[56] References Cited

UNITED STATES PATENTS

| | | | |
|---|---|---|---|
| 3,242,487 | 3/1966 | Hammack | 343/8 |
| 3,267,468 | 8/1966 | Stull, Jr. | 343/8 |
| 3,430,236 | 2/1969 | Gamertsfelder | 343/8 |
| 3,465,336 | 7/1969 | Fishbein et al. | 343/7.7 |

*Primary Examiner*—Benjamin A. Borchelt
*Assistant Examiner*—G. E. Montone
*Attorney*—S. A. Giarraiana et al.

[57] ABSTRACT

An improved signal-to-noise detector is provided for inclusion in the frequency trackers used in Doppler aircraft radar systems. The signal-to-noise detector of the invention samples noise over the entire pass band of the frequency tracker input except for a range of frequencies above and below the tracking frequency of the local oscillator. In this way, should the system attempt to lock onto a side lobe or image return, rather than the true Doppler return, the Doppler return would cause the noise level to rise, so that the system could not lock onto the spurious return, and in this way erroneous tracking is prevented.

4 Claims, 6 Drawing Figures

Signal + Noise and Noise Sampling
(Loop Tracking)

Unfolded Signal-Plus-Noise
and Noise Sampling

Signal During "Search"

Signal with Sidelobe

INVENTORS:
Stanley King
Peter R. Tierney

ATTORNEYS 3,710,381

SIGNAL-TO-NOISE DETECTOR FOR NON-STABILIZED DOPPLER RADAR

BACKGROUND OF THE INVENTION

The Doppler radar system as used in aircraft for navigational purposes directs microwave radio beams towards the ground and then measures the Doppler frequencies in the ground returns. Such a system is capable of determining the ground speed, drift angle, and dive or climb speed of the aircraft. The component in the Doppler radar system which measures the Doppler frequencies is called the "frequency tracker".

The Doppler returns are received by the airborne radar system in the form of a wide range of frequencies. This range can be used and measured successfully when its signal-to-noise ratio is above a certain level. The usual prior art frequency tracker system includes a signal-to-noise ratio detector which detects whether the signal-to-noise ratio is adequate for operational purposes. When the signal-to-noise ratio is above the critical level, the signal-to-noise ratio detector produces an output which switches the radar system from its "search" to its "normal" mode. However, when the signal-to-noise ratio is below the critical level, the system is prevented from entering its "normal" mode, since it would then be depending upon unreliable information.

The signal-to-noise ratio detector used in the usual prior art frequency tracker of the Doppler radar system receives two signals at different frequencies. One of the signals represents the Doppler signal plus noise, and the other represents noise alone. These two signals are detected in the prior art system, and the detected signals are subtracted to produce a direct current signal. The resulting direct current signal represents by its sense, whether the signal-to-noise ratio is above or below the critical level for successful operation of the system. This signal is applied to appropriate logic circuitry so that the radar system can be set to its "normal" mode when the signal-to-noise ratio is above the critical level.

The frequency tracker in the usual prior art Doppler radar system includes a closed loop which positions the frequency of a local oscillator to the center of a received Doppler return. The Doppler return is superimposed on a broad band noise background created by the microwave receiver noise of the radar system.

The function of the signal-to-noise ratio detector in the prior art Doppler radar system is to determine whether the signal-to-noise ratio is adequate for accurate tracking when the local oscillator is positioned within the frequency of the Doppler return.

The prior art signal-to-noise ratio detector compares signal plus noise in a narrow frequency range about the local oscillator frequency with a narrow band sample of noise. The noise sample in the prior art system is taken either at a fixed frequency outside the frequency range of any possible Doppler returns, or at a frequency proportional to the Doppler shift frequency.

The prior art approach is satisfactory in the case of the stabilized antenna Doppler radar system, wherein side lobe and image beam returns during roll or pitch of the vehicle remain below the noise level of the system. However, in the case of the non-stabilized antenna Doppler radar system, the side lobe and image beam returns can exceed the noise level. Therefore, unless the system can discriminate against these returns, there is a possibility for the frequency tracker to lock erroneously therewith.

The system of the present invention provides for such a discrimination, and this is achieved by sampling the noise over the entire pass band of the frequency tracker input, except for a range of frequencies above and below the tracking frequency of the local oscillator. The range of frequencies is selected to embrace the frequency range of the expected Doppler return. In the system of the present invention, whenever the frequency tracker locks onto a particular spectrum at a particular Doppler shift frequency, any other Doppler spectrums at other Doppler shift frequencies add to the noise level. Therefore, unless the system locks onto the largest of the Doppler returns, the total noise level due to the returns at the other frequencies will present a lock-on.

Therefore, in the system of the invention, should the frequency tracker erroneously tend to lock onto a side lobe or image beam return, the presence of the higher amplitude true return at a different Doppler shift frequency, increases the noise level to a value such that the ratio detector output will not permit the system to be switched from its "search" mode to its "normal" mode, and the system is made aware of the fact that it is attempting to lock onto an erroneous echo. Only when the true Doppler return is sent by the system of the invention, will the ratio detector produce the proper output to permit the system to be switched to its "track" mode.

DETAILED DESCRIPTION OF THE ILLUSTRATED EMBODIMENT

Figure 1:
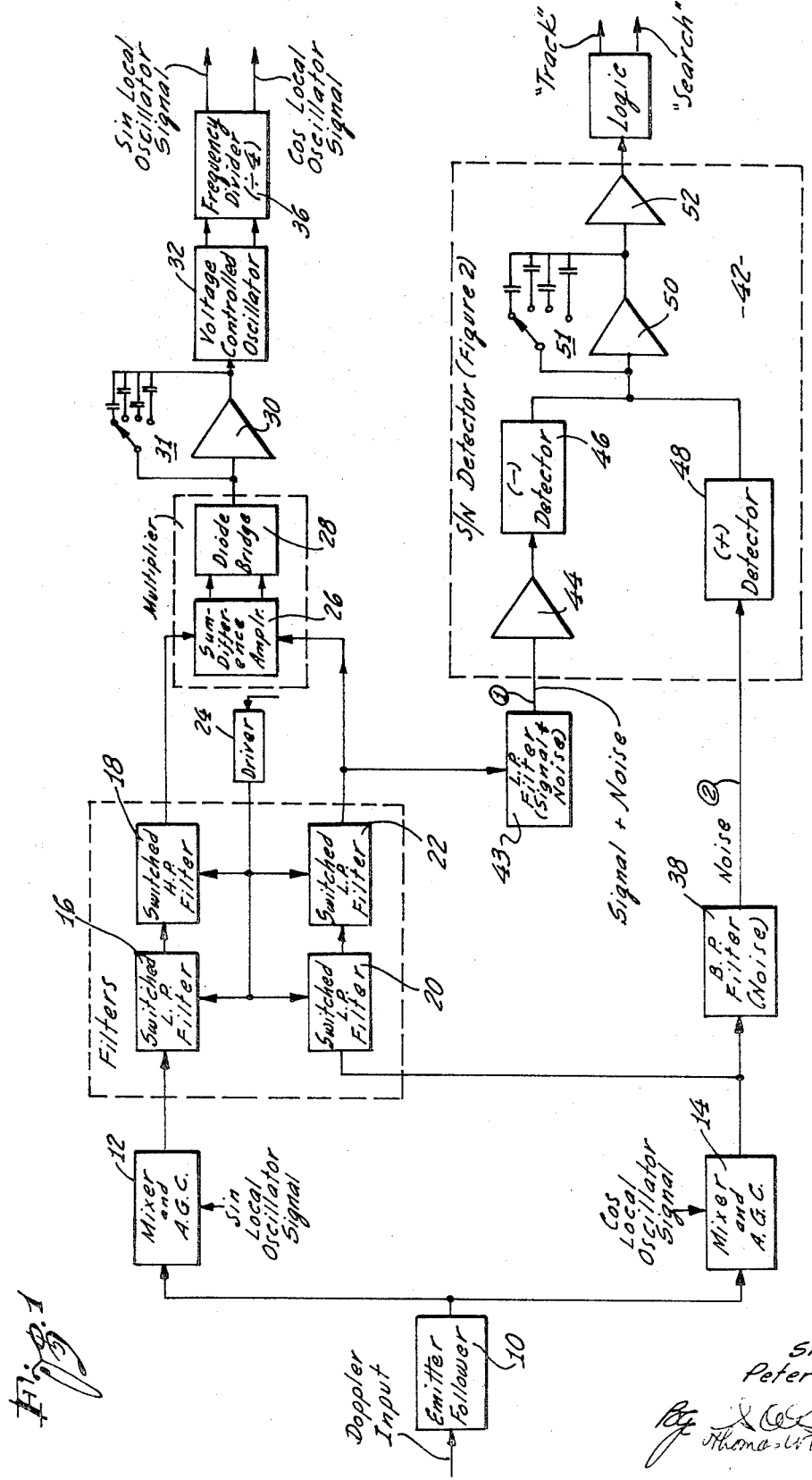
FIG. 1 is a block diagram of a portion of a Doppler radar system, and specifically a portion of the frequency tracker of the Doppler system incorporating a signal-to-noise detector system representative of one embodiment of the invention.

In the system of FIG. 1, the Doppler input is applied through an emitter follower 10 to a first heterodyne mixer and AGC circuit 12, and to a second mixer and AGC circuit 14. At this point, it might be pointed out that the emitter follower 10, as well as the mixer and AGC circuits 12 and 14, and other components shown in block form in FIG. 1, per se well known to the art, and any appropriate known circuit may be used to constitute these stages. Therefore, a detailed description of the circuitry involved therein is deemed unnecessary for the full disclosure of the present invention.

The output of the mixer and AGC circuit 12 is applied to a switched low pass filter 16, the output of which is applied to a switched high pass filter 18. The output of the mixer and AGC circuit 14 is applied to a switched low pass filter 20, the output of which is applied to a switched low pass filter 22. The filters 16, 18, 20 and 22 are controlled by a switching signal derived in known manner in the radar system, and applied to the filters through an appropriate driver stage 24. The filters are thereby controlled to be wide band during the "search" mode and narrow band during the "-track" mode.

The outputs from the filters 18 and 22 are applied to a sum-difference amplifier 26, the output of which is applied to a diode bridge 28. The circuits 26 and 28 are included in a multiplier stage which produces a direct current output corresponding to the algebraic sum of the outputs from the filters 18 and 22. The output from the multiplier is applied through an operational amplifier 30 to a voltage controlled oscillator 32, the oscillator 32 constituting the local oscillator of the system. The output from the oscillator 32 is passed through a four-stage frequency divider 36, and the local oscillator signals for the mixers 12 and 14 are derived from the frequency divider. For example, the sine local oscillator signal is applied to the mixer 12, and the cosine local oscillator signal is applied to the mixer 14.

The output from the mixer 14 is also passed through a band pass filter 38 to an amplifier 40 in the signal-to-noise ratio detector 42. The output from the low pass filter 22 is passed through a low pass filter 42 to a second amplifier 44 in the signal-to-noise ratio detector 42. As will be described, the signal plus noise components are applied to the amplifier 44, whereas noise alone is applied to the amplifier 40.

The output of the amplifier 44 is applied to a (minus) detector 46, whereas the output from the amplifier 40 is applied to a (plus) detector 48. The output of the detectors 46 and 48 are applied to an operational amplifier 50 which, in turn, is connected to a second operational amplifier 52. The output of the amplifier 52 is applied to appropriate logic circuitry 54, and the latter circuit develops the "track" switching signal whenever the signal-to-noise ratio is above the critical level.

The particular system in which the circuit of FIG. 1 is incorporated is a frequency tracker module consisting of four identical frequency trackers, one for each radiated beam. In such a system, four frequency trackers are required to accommodate the large variations in signal-to-noise in each beam. The output of the system is switched consecutively among the four frequency trackers, supplying an input to each individual tracker only during its associated beam period. The ratio detector system of FIG. 1 is common for all four trackers, and appropriate switching circuitry is associated with the operational amplifiers 30 and 50, as designated by the switches 31, 51, and associated capacitors. A different capacitor is switched into the amplifier circuit as the system is switched from one frequency tracker to another.

The system of FIG. 1 provides a tracking loop, in which the local oscillator signals from the voltage controlled oscillator 32 are mixed with the Doppler spectrum in the mixers 12 and 14. Error signals proportional to the frequency difference between the local oscillator signals and the center of the Doppler spectrum are derived and are used to shift the frequency of the local oscillator 32 until the frequency difference is zero. The oscillator frequency then becomes an analog of the main frequency of the Doppler spectrum.

The operation of the discriminator loop of FIG. 1 starts with the receipt of time-sequenced Doppler spectra signals from the emitter follower 10. These signals are fed into the balanced mixers 12 and 14, and the two sine and cosine local oscillator inputs separated by 90° are supplied to the balanced mixers. The incoming Doppler spectra are thus translated in the mixing process to be disposed about zero frequency. The effect of the 90° displaced local oscillator signals in their respective mixers 12 and 14 produces, at the mixer outputs, the sine and cosine of all the component frequencies contained in the translated spectra.

The low pass filtering of the switched low pass filters 16 and 20 rejects all but the difference frequencies in each channel. The resulting difference frequencies from the filters 16 and 20 are then passed through the low pass filter 22 in the cosine channel and the high pass filter 18 in the sine channel. These two filters shift the two channel frequencies back in phase with one another. The signals are then multiplied in the multipliers 26, 28, and the multiplier generates a direct current error signal which is positive when the local oscillator output is greater than the input center frequency, and which is negative when the local oscillator output is less than the input center frequency. This follows because the sine of a negative angle is negative, whereas the cosine remains positive.

Specifically, the two signals are processed in the sum-difference amplifier 26, where one output is the sum and the second output is the difference of the input signals. The sum and difference signals are then rectified and subtracted from each other in the diode bridge 28. The combination of the stages 26 and 28 produces a satisfactory substitute for true multiplication. The direct current error signal is now applied to an integrator circuit provided by the circuit of the operational amplifier 30. The integrator output is a direct voltage, and this voltage controls the voltage controlled local oscillator 32 so that the difference between the frequency of the local oscillator 32 and the center of the received Doppler spectrum is brought to zero.

The signal-to-noise detector 42, in accordance with the concepts of the present invention, and as explained above, compares the signal plus noise in a narrow frequency range about the local oscillator frequency with noise sampled over the entire pass band of the frequency tracker input with the exception of the frequency range above and below the tracking frequency of the local oscillator. Specifically, the signal-to-noise detector 42 compares the noise power in a fixed broad band with the signal plus noise power in a narrow band about the tracking frequency of the loop. A "-track" switching signal is produced as a result of this measurement, if the signal-to-noise ratio is above the critical value.

Figure 3:
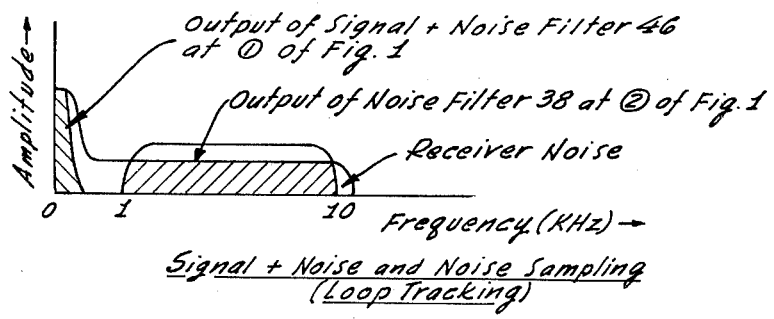
FIGS. 3–6 are curves useful in explaining the operation of the invention.
Figure 4:
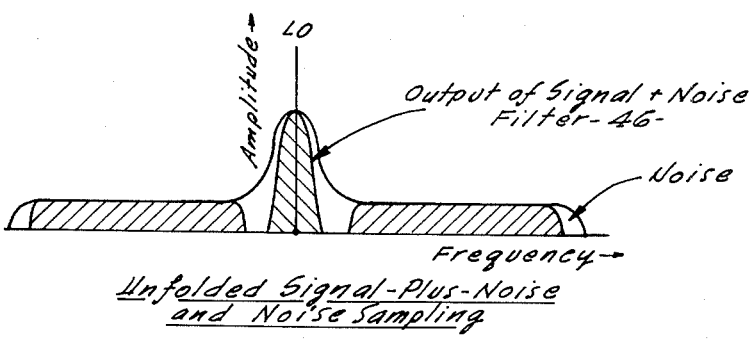

The broad band Doppler input from the emitter follower is mixed in the mixer 14 with the local oscillator frequency which translates the input and folds it about zero frequency. The narrow low pass filter 43 samples the input near the zero frequency to provide the signal plus noise samples for the detector. The band pass filter 38 passes signals, for example, between 1 and 10 KHz, to provide two noise samples, one above and one below the original Doppler spectrum, as shown in FIG. 3, and which occur because of the folding in the mixer.

Figure 5:
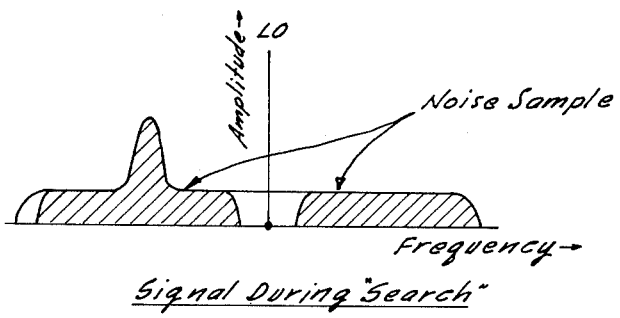
Figure 6:
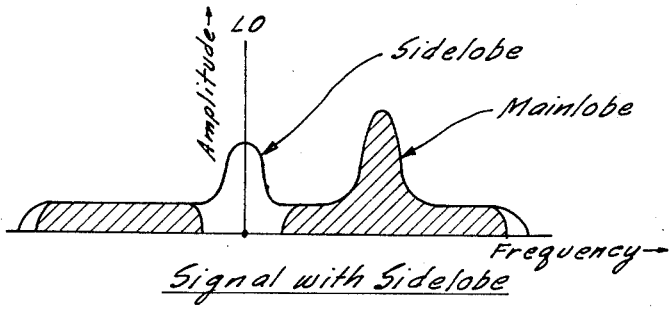

During the "search" mode when the tracking loop is not tracking the signal, the noise sample may include the signal. This condition will increase the noise level, as shown in FIG. 5, so that the ratio detector does not produce the "track" mode switching signal, and the system remains in its search mode. The noise sample is selected to cover almost the entire frequency range of the background noise so as to prevent lock-on to a side lobe in the presence of a predominant main lobe signal, as mentioned above. Should the tracker attempt acquisition of a side lobe return, the main lobe will add to the level in the noise channel and thereby prevent a "track" indication, as shown by the curve of FIG. 6. At this time, the tracking filter will broaden to a 0.6 KHz and the discriminator will now encompass both spectra. Since the main lobe signal is considerably larger, discriminator action will re-position the local oscillator frequency at the main lobe return. A "track" indication from the logic 54 reduces the filter width allowing the tracker to track the main lobe.

In the signal-to-noise detector 42 of FIG. 1, the output of the mixer 14 is passed through the 1–10KHz band pass filter 38 and is directed to the positive detector 48 producing the noise input to the signal-to-noise detector 42. The output of the cosine filter 22 in the tracking loop is further reduced in band width at 160 Hz by the low pass filter 43, and is then directed to the negative detector 46 to produce the signal-to-noise input to the signal-to-noise detector 42. The two detector outputs are summed in the amplifier 50, which has a long time constant smoothing circuit with the switched capacitors for each sequentially radiated beam, as explained above. The output of the detector circuit is applied to the logic circuit 54 which, in turn, produces the "track" and "search" outputs for each beam during the time the beam is tracked in the tracking loop.

Figure 2:
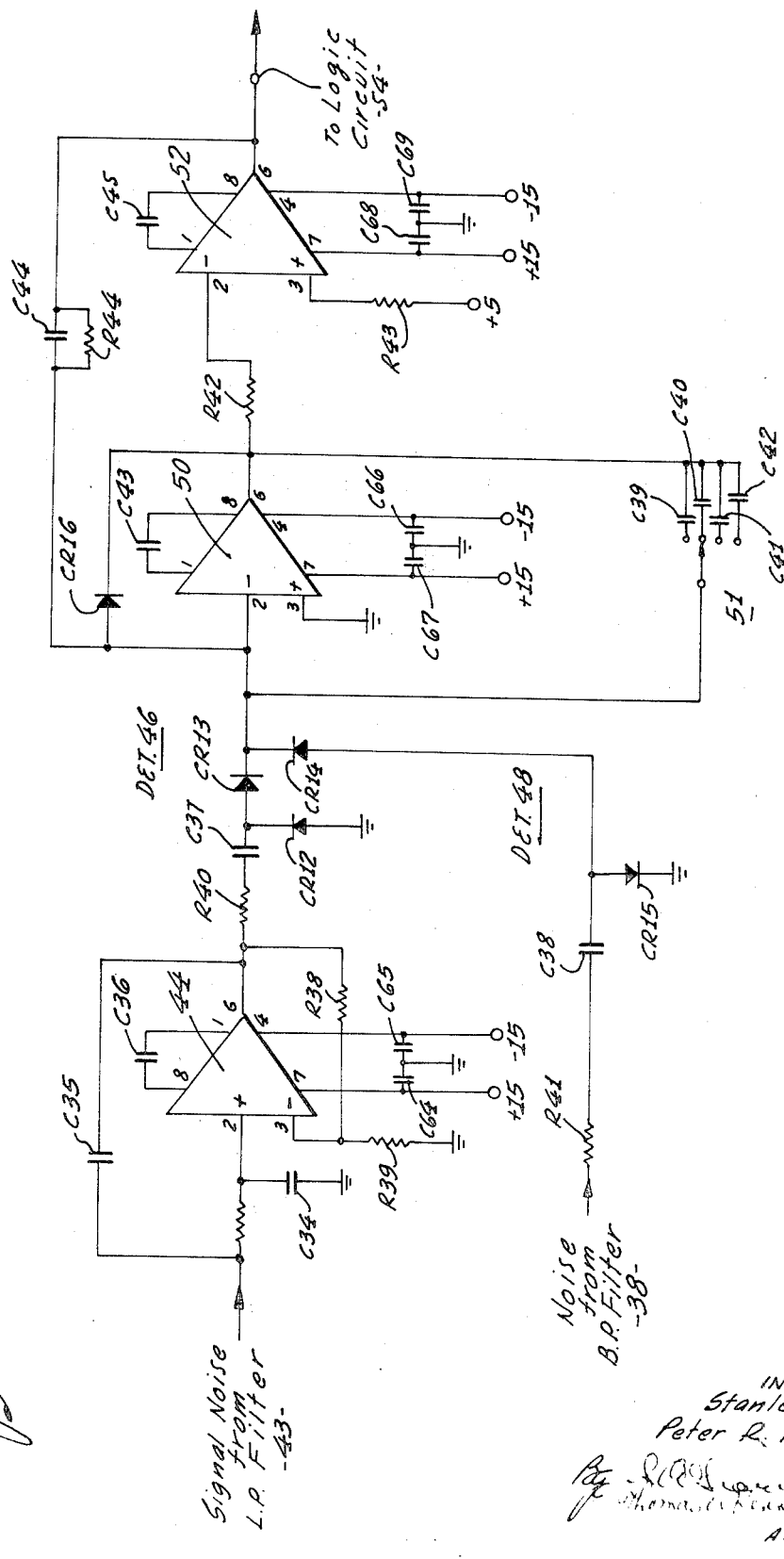
FIG. 2 is a more detailed diagram of the signal-to-noise detector component of the system of FIG. 1.

As shown in more detail in FIG. 2, the signal-to-noise detector 42 may include an operational amplifier 44. The signal derived from the low pass filter 43 is introduced to the positive input of the amplifier through a resistor R37, which is connected to a grounded capacitor C34. The resistor R37 may have a resistance of 16.9 kilo-ohms, whereas the capacitor 34 may have a capacity of 470 micro-microfarads. The negative input terminal of the amplifier 44 is connected to a grounded resistor R39 which may have a resistance, for example, of 10 kilo-ohms. The output of the amplifier is coupled back to the input through a feedback capacitor C35 having a capacity, for example, of 1000 micromicrofarads. Also, a resistor R38 connects the output back to the negative input.

The output of the amplifier 44 is connected to a resistor R40 which, in turn, is connected to a coupling capacitor C37. The resistor R40 may have a resistance of 61.9 kilo-ohms, and the capacitor C37 may have a capacity of 0.01 microfarads. The negative detector 46 is formed by the diodes C12 and C13, whereas the positive detector 48 is formed by the diodes CR14. The diodes may be of the type designated IN914. The noise from the band pass filter 38 is passed through a resistor R41 and through a coupling capacitor C38 to the diode CR14. The resistor R41 may have a resistance of 10 kilo-ohms, and the capacitor C38 may have a capacity of 1.0 microfarads. The capacitors are connected to the anode of a diode CR15 which, with the diode CR14, provides the positive detector 48.

The common output terminal of the detectors 46 and 48 is connected to the negative input terminal of the amplifier 50. The positive input terminal of the amplifier is grounded. The amplifier is shunted by diode CR16 which may be of the type designated IN3595. The output of the amplifier 50 is connected to the negative input of the amplifier 52 through a resistor R42 which may have a resistance of 10 kilo-ohms. The positive input of the amplifier 52 is connected to a 10 kilo-ohm resistor R43 which, in turn, is connected to the positive terminal of a unidirectional source. The output of the amplifier 52 is connected back to the input of the amplifier 50 through a capacitor C44, the capacitor being shunted by a resistor R44. The capacitor C44 may have a capacity of 0.1 microfarads, whereas the resistor R44 may have a resistance of 300 kilo-ohms. The output of the amplifier 52 is applied to the logic circuit 54.

The invention provides, therefore, an improved signal-to-noise ratio detector system, which finds particular utility in a non-stabilized antenna Doppler radar system, and which serves to provide tracking command signals for the system only when the frequency tracker has actually locked onto a valid Doppler return. It will be appreciated that although a particular embodiment of the invention has been shown and described, modifications may be made. It is intended in the following claims to cover all modifications which come within the spirit and scope of the invention.

What is claimed is:

1. A signal-to-noise ratio detector system for use in the frequency tracker of a Doppler radar in which a spectrum of Doppler returns superimposed on a noise background is mixed with a local oscillator signal derived from a tracking local oscillator, said ratio detector system including:

first circuit means for sampling the background noise over the entire pass band of the frequency tracker input except for a relatively narrow frequency range in the vicinity of the tracking frequency of the local oscillator corresponding to the spectrum of Doppler returns;

second circuit means for sampling the Doppler spectrum return signals in the aforesaid frequency range in the vicinity of the tracking frequency of the local oscillator; and detector circuitry coupled to said first and second circuit means for comparing the signals from said first and second circuit means to produce an output signal indicative of whether the signal-to-noise ratio is above a predetermined minimum level.

2. The system defined in claim 1, in which said relatively narrow frequency range extends above and below the tracking frequency of the local oscillator.

3. The combination defined in claim 1, in which said first circuit means comprises a band pass filter.

4. The system defined in claim 1, in which said detector circuitry includes a negative detector for detecting the output from said second circuit means, and a positive detector for sampling the output of said first circuit means, and circuitry connected to said positive detector and negative detector for summing the output thereof to produce said output signal.

* * * * *